(12) United States Patent  
Bedard

(10) Patent No.: US 11,751,684 B2
(45) Date of Patent: Sep. 12, 2023

(54) ROD HOLDER

(71) Applicant: Jean Francois Bedard, Palm Harbor, FL (US)

(72) Inventor: Jean Francois Bedard, Palm Harbor, FL (US)

(*) Notice: Subject to any disclaimer, the term of this patent is extended or adjusted under 35 U.S.C. 154(b) by 0 days.

(21) Appl. No.: 17/382,612

(22) Filed: Jul. 22, 2021

(65) Prior Publication Data

US 2023/0172355 A1 Jun. 8, 2023

(51) Int. Cl.
*A47B 81/00* (2006.01)
*A01K 97/10* (2006.01)

(52) U.S. Cl.
CPC ............ *A47B 81/005* (2013.01); *A01K 97/10* (2013.01)

(58) Field of Classification Search
CPC ........ A47B 81/00; A47B 81/005; A01K 97/10
USPC ....................................................... 211/70.8
See application file for complete search history.

(56) References Cited

U.S. PATENT DOCUMENTS

| | | | | |
|---|---|---|---|---|
| 1,240,705 | A | * | 9/1917 | Grode ..................... A63D 15/10 211/68 |
| 1,428,810 | A | * | 9/1922 | Shoemaker ............ A47G 25/12 70/62 |
| 1,552,535 | A | | 11/1924 | Beerstecher |
| 2,453,319 | A | | 11/1948 | Hollyday |
| 2,580,625 | A | * | 1/1952 | Waltz .................... A01K 97/10 211/89.01 |
| 2,797,851 | A | | 2/1955 | Leake |
| 2,946,452 | A | * | 7/1960 | Caloiero ............... A47B 81/005 211/4 |
| 3,113,363 | A | | 12/1963 | Fyvie |
| 3,159,372 | A | | 12/1964 | McIntosh |
| 3,273,091 | A | | 9/1966 | Wales |
| 3,507,398 | A | * | 4/1970 | Schaefer ............... A47B 81/005 211/4 |
| 3,524,572 | A | * | 8/1970 | Hall ........................ B60R 5/006 224/311 |
| 3,558,090 | A | * | 1/1971 | Bird ...................... A47B 81/005 248/309.1 |
| 3,635,433 | A | * | 1/1972 | Anderson .............. A01K 97/08 211/70.8 |
| 3,643,811 | A | * | 2/1972 | Howerton ............ A47B 81/005 211/64 |
| 3,672,513 | A | * | 6/1972 | Riddle .................... A01K 97/10 211/70.8 |
| 3,731,817 | A | | 5/1973 | Fowlkes |
| 3,744,833 | A | | 7/1973 | Berducone |

(Continued)

FOREIGN PATENT DOCUMENTS

EP 1058067 A2 * 12/2000 ............... F24F 13/20

*Primary Examiner* — Stanton L Krycinski
(74) *Attorney, Agent, or Firm* — Andrew W. Ludy

(57) ABSTRACT

A rod holder is mounted on an upright or a horizontal structure to hold a rod, such as a fishing rod. A latch is pivotally mounted on a base with a pivot pin. The rod is received in a latch aperture to pivot the latch closed. The rod is removed from the latch aperture to pivot the latch open. An arcuate slot in the base or the latch is centered about the pivot axis. A limit pin is received in the arcuate slot to stop the latch in the open and closed positions. A base magnet and a latch magnet follow arcuate paths of the same radius. The latch magnet will pass over the base magnet as the latch pivots. Like poles of the base magnet and the latch magnet repel one another to hold the latch open or closed.

25 Claims, 15 Drawing Sheets

(56) References Cited

U.S. PATENT DOCUMENTS

| | | | | |
|---|---|---|---|---|
| 3,792,775 | A * | 2/1974 | Riddle | A01K 97/10 211/70.8 |
| 3,876,076 | A * | 4/1975 | Hazelhurst | A01K 97/08 211/4 |
| 3,995,742 | A | 12/1976 | Austin | |
| 4,006,825 | A * | 2/1977 | Austin | A01K 97/08 211/70.8 |
| 4,027,798 | A * | 6/1977 | Swaim | A01K 97/08 211/4 |
| 4,132,381 | A | 1/1979 | McClellan | |
| 4,450,989 | A | 5/1984 | Bogar | |
| 4,596,334 | A * | 6/1986 | Daulton | A47B 81/005 211/4 |
| 4,776,471 | A * | 10/1988 | Elkins | A47B 57/52 211/64 |
| 4,856,221 | A | 8/1989 | Thompson | |
| 4,881,386 | A * | 11/1989 | Glines | B60R 7/14 70/19 |
| 4,897,952 | A | 2/1990 | Hawie | |
| 4,986,427 | A * | 1/1991 | Law | A47B 81/005 211/117 |
| 5,184,794 | A | 2/1993 | Saito | |
| 5,307,585 | A * | 5/1994 | Thompson | A01K 97/10 211/70.7 |
| 5,339,966 | A * | 8/1994 | Bastiaans | A47B 81/005 211/4 |
| 5,344,032 | A * | 9/1994 | Ramsdell | A47B 81/005 211/64 |
| 5,361,611 | A * | 11/1994 | Hisler | A01K 97/00 211/4 |
| 5,438,787 | A * | 8/1995 | McMaster | A47B 81/005 211/64 |
| 5,524,772 | A * | 6/1996 | Simmons | A47B 81/005 211/4 |
| 5,560,497 | A * | 10/1996 | Mulvihill, Jr. | A47F 5/08 211/4 |
| 5,934,112 | A * | 8/1999 | Rice | B60R 7/14 70/18 |
| 6,370,810 | B1 | 4/2002 | Widerman | |
| 6,831,541 | B1 | 12/2004 | Seidler | |
| 6,932,224 | B1 * | 8/2005 | Sandberg | A47B 81/005 211/70.8 |
| 7,047,771 | B2 * | 5/2006 | Tanos | E05B 15/0046 211/64 |
| 7,219,464 | B1 * | 5/2007 | Kujawa | A01K 97/08 211/70.8 |
| 7,656,257 | B2 | 2/2010 | McCarthy | |
| 8,359,707 | B1 | 1/2013 | Prezner | |
| 8,616,505 | B2 * | 12/2013 | Gates | F16M 11/041 248/62 |
| 8,889,636 | B2 | 12/2014 | Fitzgerald | |
| 8,950,596 | B2 * | 2/2015 | Arabian | A47B 81/005 211/64 |
| 8,991,224 | B2 * | 3/2015 | Zalavari | F41A 23/18 70/18 |
| 9,151,082 | B2 * | 10/2015 | Zalavari | A47B 81/00 |
| 9,295,326 | B2 * | 3/2016 | Sassman | A47B 81/00 |
| 9,481,312 | B2 * | 11/2016 | Irwin | E05B 73/00 |
| 9,963,913 | B2 | 5/2018 | Howell | |
| 10,219,619 | B1 * | 3/2019 | Smith | A47F 5/08 |
| 10,563,943 | B2 * | 2/2020 | Irwin | F41A 17/06 |
| 10,722,027 | B2 * | 7/2020 | Pintar | A47B 81/005 |
| 10,874,212 | B2 * | 12/2020 | Wood | A47B 81/005 |
| 11,076,692 | B2 * | 8/2021 | Canova | F16B 2/10 |
| 2005/0023841 | A1 | 2/2005 | Chen | |
| 2006/0027473 | A1 * | 2/2006 | Taylor | F41C 33/06 206/315.11 |
| 2006/0243686 | A1 * | 11/2006 | Grayson | A47B 81/005 211/70.6 |
| 2014/0298709 | A1 * | 10/2014 | Wolfbauer | A47F 7/0021 43/54.1 |
| 2016/0143437 | A1 * | 5/2016 | Gabriel | A45F 3/08 224/153 |
| 2017/0030114 | A1 * | 2/2017 | Fisher | E05B 73/00 |
| 2017/0082388 | A1 * | 3/2017 | Plourde | F41A 23/18 |
| 2019/0246794 | A1 * | 8/2019 | Neese | B63B 29/02 |

\* cited by examiner

ROD HOLDER

TECHNICAL FIELD

The presently disclosed technologies are directed to an apparatus for storing and supporting an elongated tool, and pertains, more specifically, to a holder to encircle and support a fishing rod, and having a magnetic latch.

BACKGROUND

In rod or tool holders, and particularly in fishing rod holders installed under the gunwale of fishing boats, the rod is typically pushed or hooked in place. It is held secure by a sliding closure, or an elastic band. The fishing rod must be easily and freely installed in the rod holder, yet be held securely and supported in the closed position. The rod holder must release easily, yet not be loosened by the motion of the boat in a seaway (rough water due to weather), and with an aggressive driver. The fishing rod must also be held securely in the event of rattling or vibrating in use. The fishing rod holder must be able to withstand the rigors of marine service and a corrosive environment.

Fishing rod holders, as well as all marine systems, must withstand forces generated by the six ship motions: roll (rotation about a longitudinal axis); pitch (rotation about a transverse axis); yaw (rotation about a vertical axis); surge (translation along a longitudinal axis); sway (translation along a transverse axis); and heave (translation along a vertical axis). Add to this, sudden acceleration down the face of a wave, or deceleration crashing into a wave.

Rod or tool holders are known and, heretofore, have been configured in different ways. Some examples of rod or tool holders in the prior art are seen in the following U.S. patents:

Austin, U.S. Pat. No. 3,995,742; shows a C-shaped support with a closure 27 pivoting on a living hinge 29, which pivots into and out of locking position to retain the rod. The C-shaped support does not closely contain the rod, allowing the rod to rattle as the boat moves in rough water. The closure gate 27 does not securely latch closed, and would allow the rod to jump out of the C-shaped support as the boat moves abruptly about.

Fowlkes, U.S. Pat. No. 3,731,817; illustrates a flexible C-shaped or U-shaped hook into which the rod snaps. The flexible hook will not hold the rod securely in rough weather.

Hawie, U.S. Pat. No. 4,897,952; discloses a pair of C-shaped bracket members 61, each having a pivoting latch 62 with a spring-loaded sliding latch strip 64 to secure the rod. The C-shaped brackets do not closely contain the rod, allowing the rod to rattle as the boat moves in rough water. The sliding latch strip 64 could freeze from salt corrosion or dirt.

Hollyday, U.S. Pat. No. 2,453,319; shows J-shaped supporting ledge 6 with a resilient elastomer clamping ring 11, similar to an O-ring, to retain the rod. The elastomer material is subject to breaking from age and UV.

Prezner, U.S. Pat. No. 8,359,707; discloses a base 1 to receive the rod. A retainer 7 mates with receptacle hook 8 on the top portion 3 to secure the rod. A recess slot or hole 5 holds the rod in the base 1. The hole 5 is either too small to receive the rod, or large enough to allow rattle. The retainer 7 can jump upward as the boat moves, thus releasing the top portion and the rod.

Accordingly, there is a need for a rod holder that will hold a rod securely in a boat moving abruptly in a seaway, that will withstand forces generated by the six ship motions without allowing the rod to be dislodged from the holder.

There is a further need for a rod holder of the type described and that will allow the rod to be placed into the holder and removed from the holder quickly and easily There is a yet further need for a rod holder of the type described and that will not be subject to salt corrosion leading to failure.

There is a still further need for a rod holder of the type described and that can be mounted horizontally in a boat for fishing rods, or mounted vertically in a home for securing garden tools.

There is another need for a rod holder of the type described and that can be manufactured cost-effectively in large quantities of high quality.

SUMMARY

In one aspect, a rod holder is used in connection with an elongated rod and a structure. The rod holder comprises a base with a base aperture for receiving the rod. The base has a mounting edge adapted for mounting on the structure. The base aperture is open outward away from the mounting edge. The base has a base pivot axis, and a base detent hole.

The rod holder has a latch with a latch aperture for receiving the rod. The latch is pivotally mounted on the base for pivotal movement between a latch open position and a latch closed position. The latch has a latch pivot axis about which the latch pivots. The latch pivot axis is in axial alignment with the base pivot axis. The latch aperture is open outward away from the latch pivot axis. The latch has a latch detent hole.

Magnetic detent means is provided for magnetically holding the latch in the latch open position and in the latch closed position. In the latch open position, upon placing the rod into the rod holder, the rod will be received in the base aperture and the latch aperture. The rod will pivot the latch into the latch closed position. The magnetic detent means will secure the latch in the latch closed position. The rod holder will then support the rod in a resting position.

In the latch closed position, upon removing the rod from the rod holder, the rod will pivot the latch into the latch open position. The rod will be removed from the base aperture and the latch aperture. The magnetic detent means will secure the latch in the latch open position.

The base further comprises a first mounting edge for mounting on the structure. In this mounting, the structure is disposed generally upright. The base also has a second mounting edge for mounting on the structure. In this mounting, the structure is disposed generally horizontal.

A pivot pin extends between opposite ends. The pivot pin is fixedly received in a fixed pivot hole in either one of the base or the latch at the pivot axis. The pivot pin is pivotally received in a free pivot hole in the opposite one of the base or the latch at the pivot axis.

An arcuate slot is formed in either one of the base or the latch. The arcuate slot extends between opposite ends, and is centered about the pivot axis. A limit pin extends between opposite ends. The limit pin is fixedly received in a limit pin hole in either one of the base or the latch opposite the arcuate slot. The limit pin is freely received in the arcuate slot. In the latch open position, the limit pin will engage the arcuate slot at one end of the slot. In the latch closed position, the limit pin will engage the arcuate slot at the opposite end of the slot. In this manner, the pivotal movement of the latch is limited.

The magnetic detent means further comprises a base magnet received in the base detent hole. A latch magnet is received in the latch detent hole. The base magnet and the latch magnet are adapted to follow arcuate paths of the same radius as the latch pivots between the latch closed position and the latch open position. Thus, the latch magnet will pass over the base magnet. The magnets are mounted so that like poles of the base magnet and the latch magnet are facing one another. Hence, the magnets will repel one another. In the latch open position, the repulsion of the base magnet and the latch magnet will hold the latch open. In the latch closed position, the repulsion of the base magnet and the latch magnet will hold the latch closed.

The base and the latch are preferably constructed of a polymeric material. Some examples are thermoplastic resins and thermoset resins. It is to be understood that these examples are non-limiting.

In one exemplary embodiment, the base and the latch are disposed generally horizontal with the pivot axis extending upward. In the latch closed position, the rod holder will support the rod in the resting position with the rod disposed generally upright.

In another exemplary embodiment, the base and the latch are disposed generally upright with the pivot axis extending generally horizontal. In the latch closed position, the rod holder will support the rod in the resting position with the rod disposed generally horizontal.

In the latch closed position and with the rod in the resting position, the rod is preferably disposed generally above the latch pivot axis. This juxtaposition is optional, and will minimize a rotational moment which would pivot the latch into the latch open position.

In another aspect, a rod holder is used in connection with a fishing rod and a boat structure. The rod holder comprises a base, having a base aperture for receiving the fishing rod. The base has a mounting edge adapted for mounting on the boat structure. The base aperture is open outward away from the mounting edge. The base has a generally horizontal base pivot axis, and a base detent hole.

The rod holder has a latch, with a latch aperture for receiving the fishing rod. The latch is pivotally mounted on the base for pivotal movement between a latch open position and a latch closed position. The latch has a latch pivot axis about which the latch pivots. The latch pivot axis is in axial alignment with the base pivot axis. The latch aperture is open outward away from the latch pivot axis. The latch has a latch detent hole.

Magnetic detent means is provided for magnetically holding the latch in the latch open position and in the latch closed position. In the latch open position, upon placing the fishing rod into the rod holder, the fishing rod will be received in the base aperture and the latch aperture. The fishing rod will pivot the latch into the latch closed position. The magnetic detent means will secure the latch in the latch closed position. In this manner, the rod holder will support the fishing rod in a generally horizontal resting position.

In the latch closed position, upon removing the fishing rod from the rod holder, the fishing rod will pivot the latch into the latch open position. The fishing rod will be removed from the base aperture and the latch aperture. The magnetic detent means will then secure the latch in the latch open position.

The base further comprises a generally upright first mounting edge for mounting on the boat structure. This mounting is utilized where the boat structure is a wall disposed generally upright. The base also has a generally horizontal second mounting edge for mounting on the boat structure. This mounting is utilized where the boat structure is a ceiling disposed in a generally horizontal position.

The magnetic detent means includes a base magnet received in the base detent hole. Similarly, a latch magnet is received in the latch detent hole. The base magnet and the latch magnet are adapted to follow arcuate paths of the same radius as the latch pivots between the latch closed position and the latch open position. In this manner, the latch magnet will pass over the base magnet. The magnets are installed so that like poles of the base magnet and the latch magnet are facing one another. Thus, the magnets will repel one another. In the latch open position, the repulsion of the base magnet and the latch magnet will hold the latch open. In the latch closed position, the repulsion of the base magnet and the latch magnet will hold the latch closed.

These and other aspects, objectives, features, and advantages of the disclosed technologies will become apparent from the following detailed description of illustrative embodiments thereof, which is to be read in connection with the accompanying drawings.

It should be noted that the drawings herein are not to scale.

DETAILED DESCRIPTION

As used herein, "longitudinal" refers to any line extending in a direction parallel to the forward-and-aft extending centerline of the boat.

As used herein, "transverse" or "athwart" refers to a direction crosswise, or perpendicular to the centerline of the boat, and horizontal.

As used herein, "transverse plane" refers to a plane extending vertically and transversely to the centerline of the boat.

As used herein, "base plane" refers to a plane extending horizontally and touching the lowermost point of the hull or keel.

As used herein, "right" or "starboard" refers to the right-hand side of the boat from the vantage of a passenger facing forward.

As used herein, "left" or "port" refers to the left-hand side of the boat from the vantage of a passenger facing forward.

As used herein, the term "fixedly received" refers to an element inserted into a hole and secured, unable to move—for example, a pin pressed into a hole.

As used herein, the term "freely received" refers to an element inserted into a hole and able to move, as in translate or rotate readily.

Figure 1:
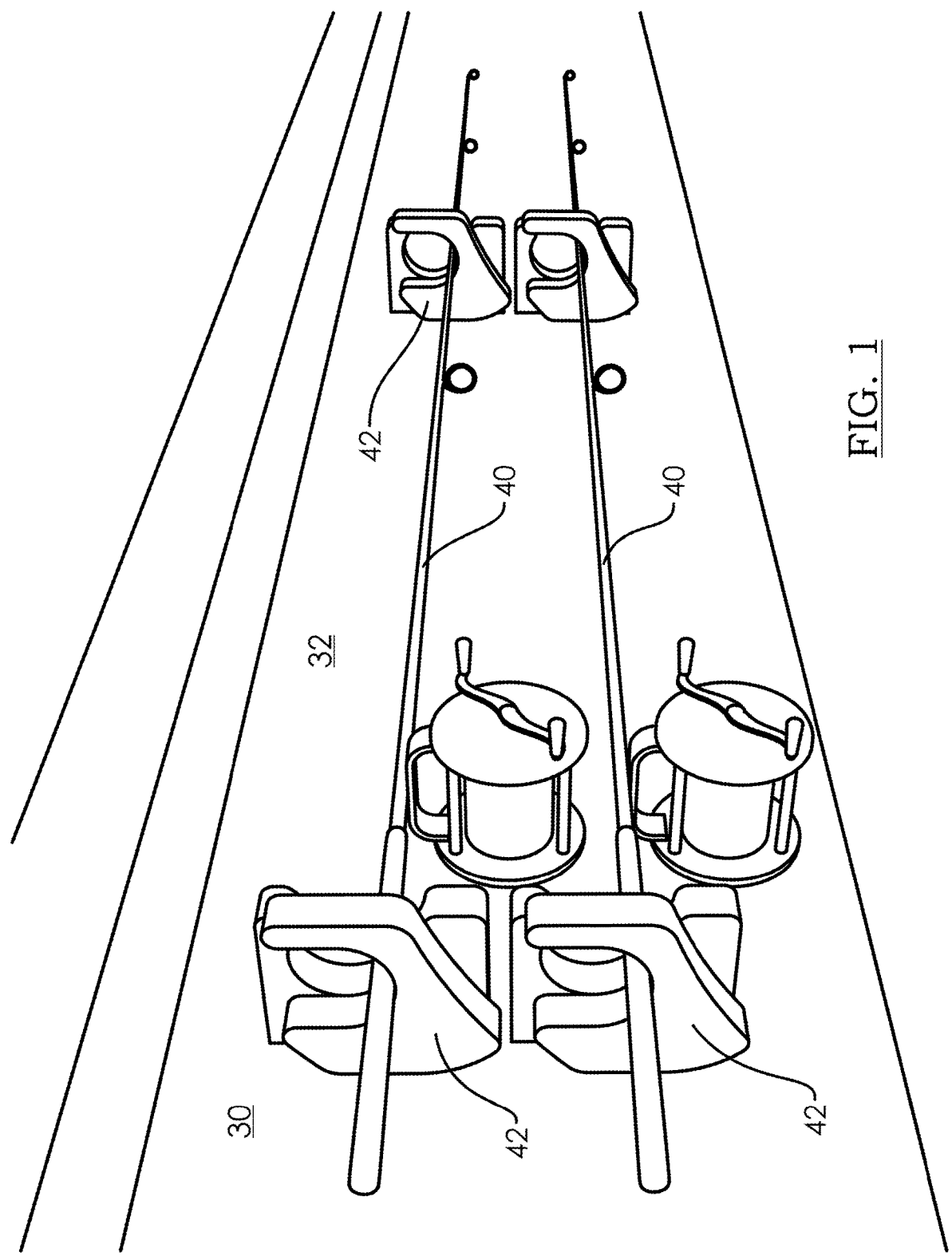
FIG. 1 is a perspective view of two fishing rods, each rod being supported at each end by an exemplary rod holder constructed in accordance with the invention, and mounted on the generally upright inboard side of a boat.
Figure 2:
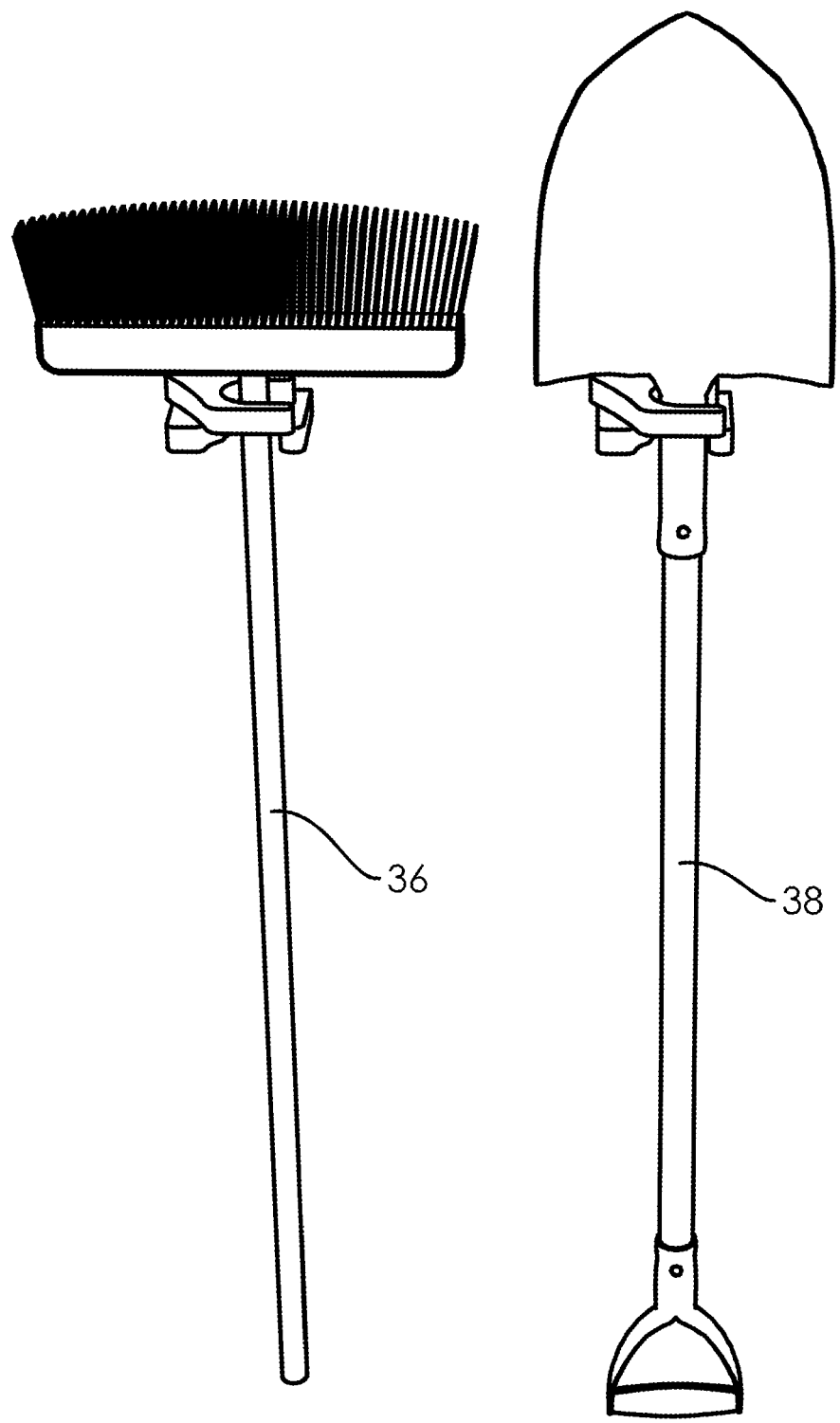
FIG. 2 is a perspective view of two garden tools, each tool being suspended upright, and supported at the upper end by the rod holder of FIG. 1, mounted on a wall.

Describing now in further detail these exemplary embodiments with reference to FIGS. 1-10, a rod holder is used in connection with an elongated rod and a structure 30. The structure 30 can be disposed generally upright as a generally vertical wall 32, as in FIG. 9. Alternatively, the structure 30 can be disposed generally horizontal as a generally horizontal ceiling 34, as in FIG. 10. The rod holder is used preferably with a fishing rod and a boat structure 30. Optionally, the rod holder can be used in a building to hold tools. For example, the rod holder can hold a cleaning tool 36, or a garden tool 38 in a garage, as shown in FIG. 2. This listing of rods and tools is non-limiting.

FIG. 1 depicts two fishing rods 40, each rod supported at each end by an exemplary rod holder 42. The rod holder 42 comprises a base 44 with a base aperture 46 for receiving the fishing rod 40. The base 44 has a mounting edge 48 adapted for mounting on the boat structure 30. The base aperture 46 is open generally outward away from the mounting edge 48. The base mounting edge 48 further comprises a generally upright first mounting edge 50 for mounting on the boat structure 30. This mounting is utilized where the boat structure 30 is a wall disposed generally upright as in FIG. 9. The base mounting edge 48 also has a generally horizontal second mounting edge 52 for mounting on the boat structure 30. This mounting is utilized where the boat structure 30 is a ceiling disposed in a generally horizontal position, as in FIG. 10. The base 44 has a base pivot axis 54, and a base detent hole 56, which is explained hereinbelow.

The rod holder 42 has a latch 58 with a latch aperture 60 for receiving the rod 40. The latch 58 is pivotally mounted on the base 44 for pivotal movement between a latch open position and a latch closed position. The latch 58 has a latch pivot axis 62 about which the latch 58 pivots. The latch pivot axis 62 is in axial alignment with the base pivot axis 54. The latch aperture 60 is open generally outward away from the latch pivot axis 62. The latch 58 has a latch detent hole 64.

Figure 3:
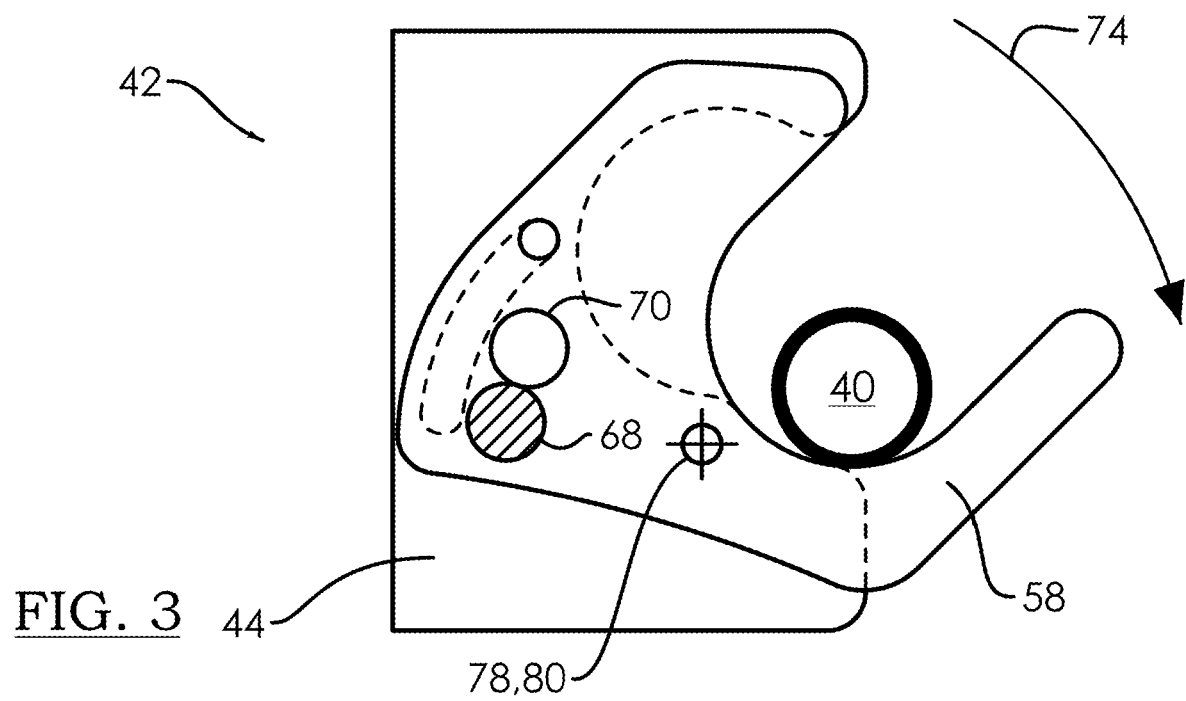
FIG. 3 is a side elevational assembly view of the rod holder of FIG. 1, showing the rod holder in the open position.
Figure 4:
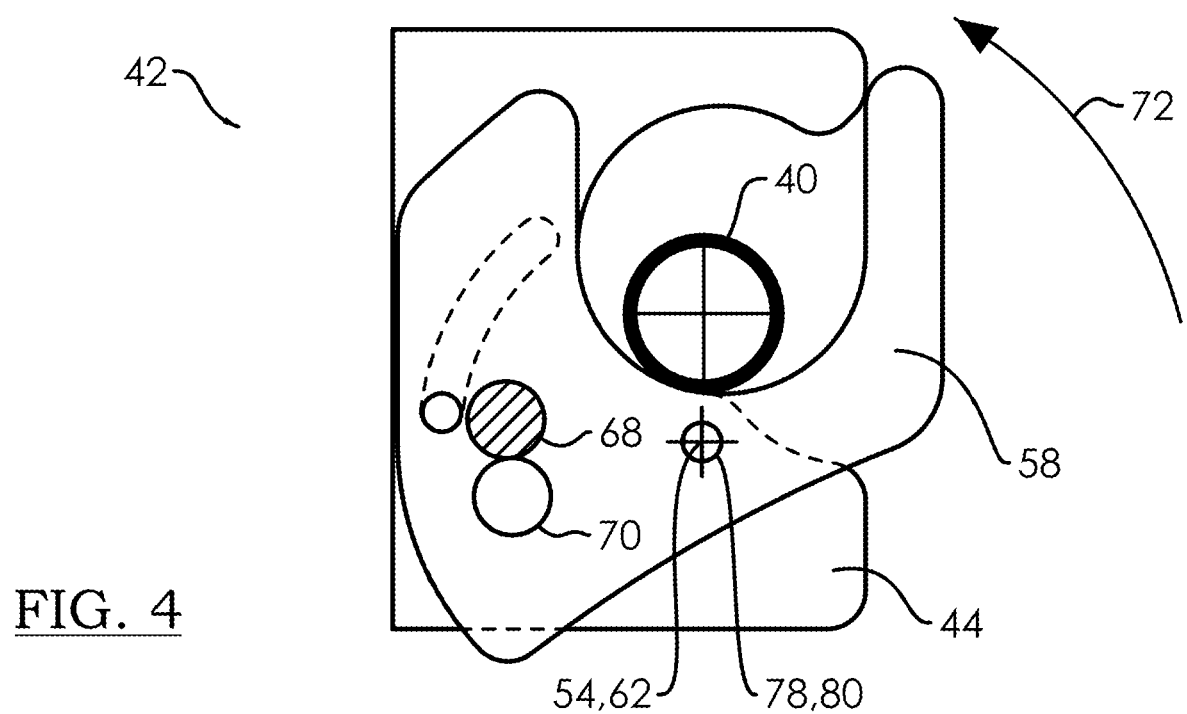
FIG. 4 is a side elevational assembly view of the rod holder of FIG. 1, showing the rod holder in the closed position, and supporting a rod.
Figure 6:
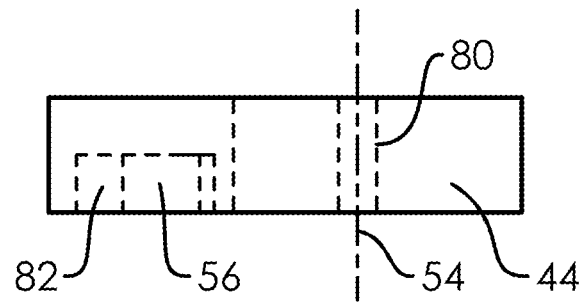
FIG. 6 is a top plan view of the base for the rod holder of FIG. 1.
Figure 5:
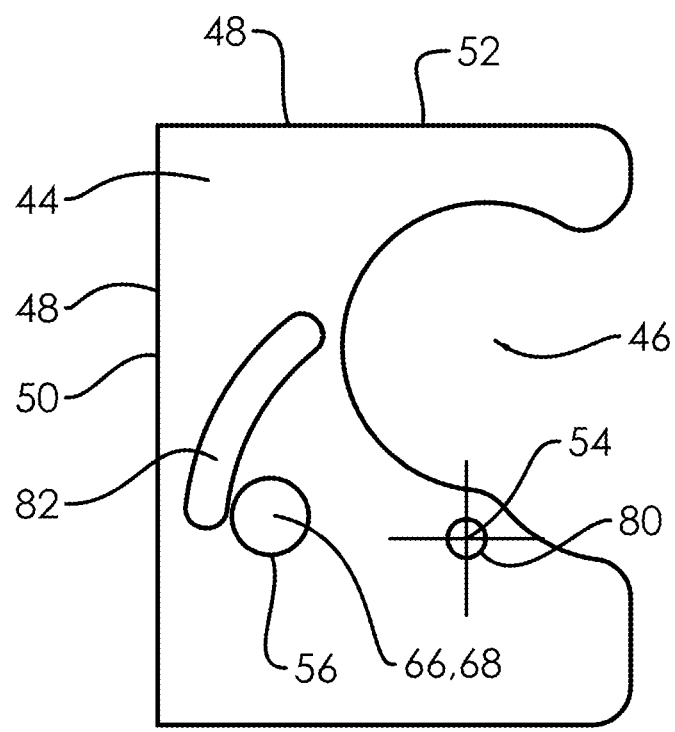
FIG. 5 is a front elevational view of a base for the rod holder of FIG. 1.
Figure 8:
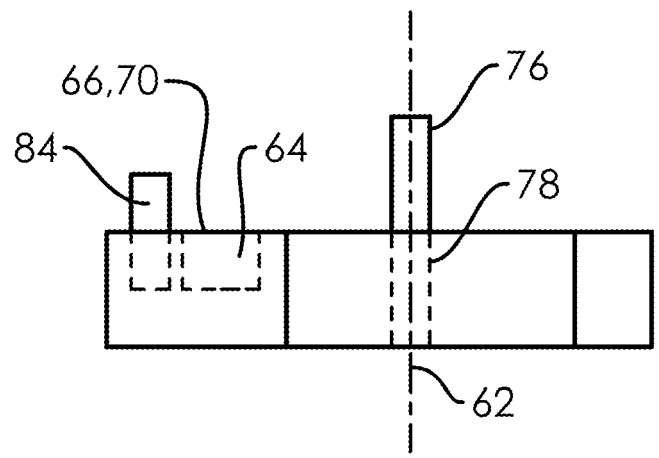
FIG. 8 is a top plan view of the latch for the rod holder of FIG. 1.
Figure 7:
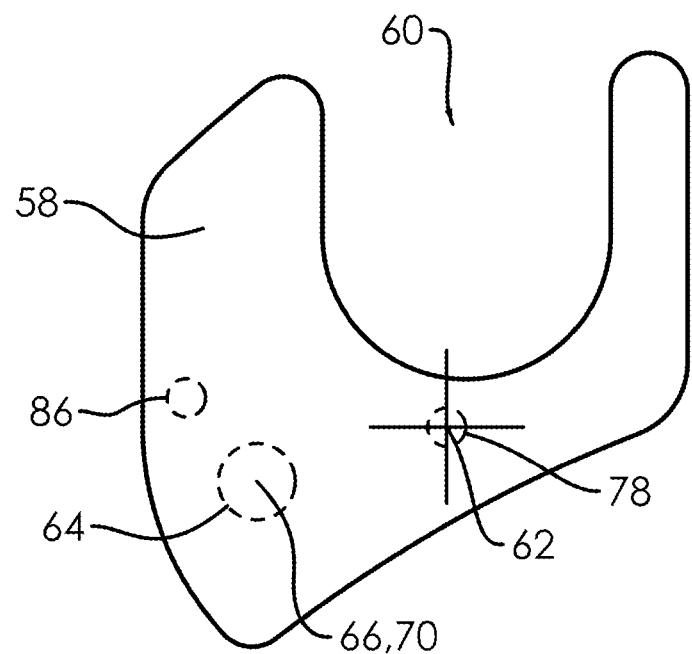
FIG. 7 is a front elevational view of a latch for the rod holder of FIG. 1.
Figure 10:
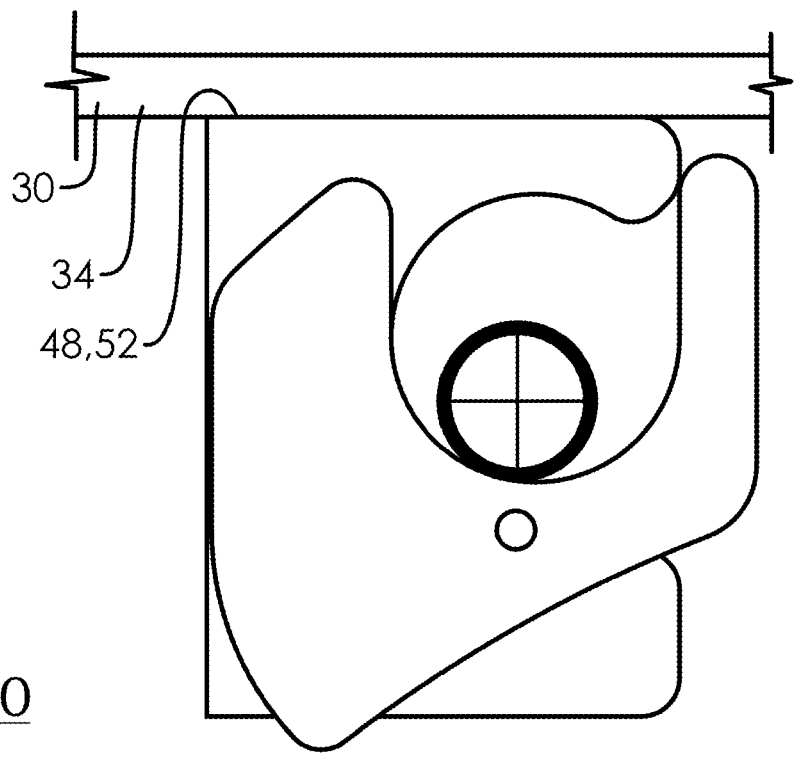
FIG. 10 is a front elevational view of the base for the rod holder of FIG. 1, with the second mounting edge attached to the generally horizontal ceiling of a boat.
Figure 9:
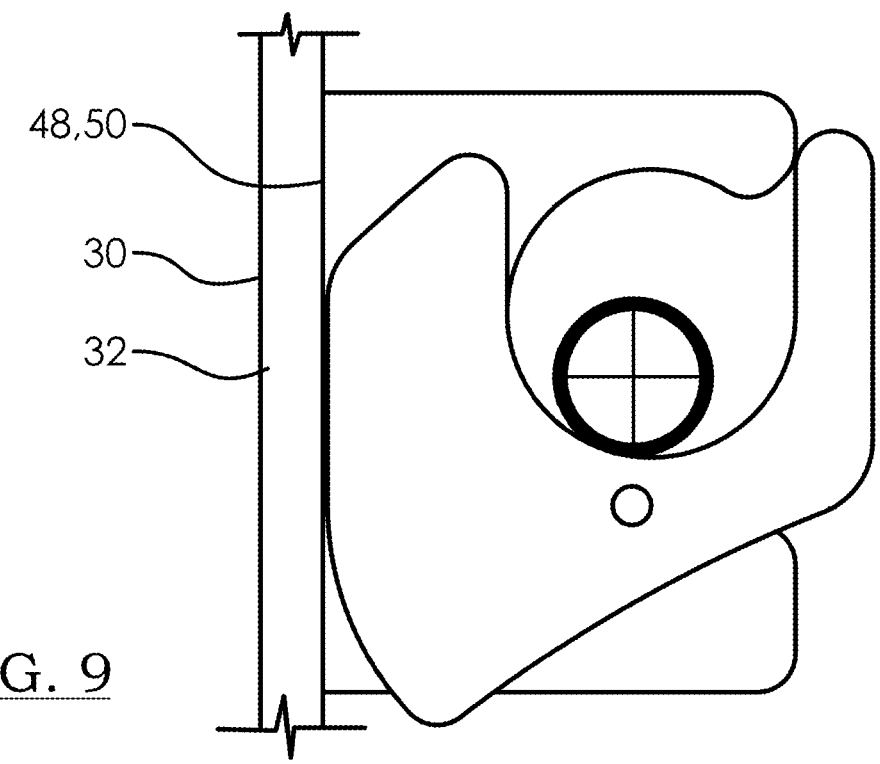
FIG. 9 is a front elevational view of the base for the rod holder of FIG. 1, with the first mounting edge attached to the generally upright inboard side of a boat.
Figure 11:
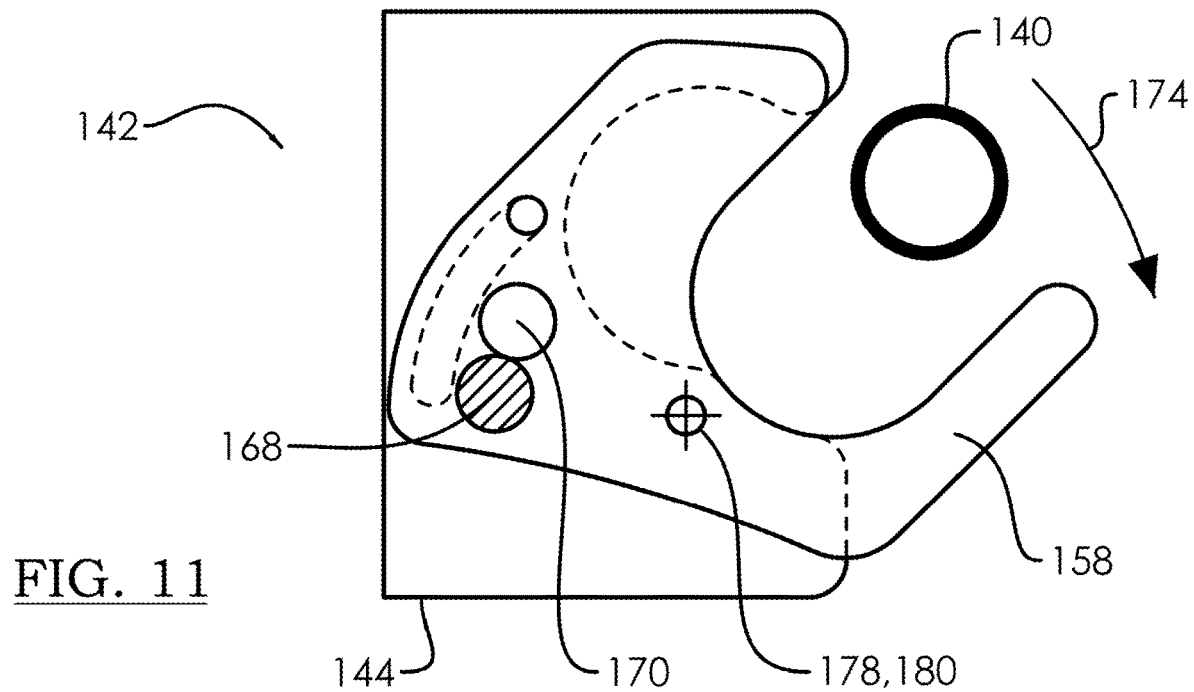
FIG. 11 is a side elevational assembly view of another exemplary rod holder constructed in accordance with the invention, showing the rod holder in the open position.
Figure 12:
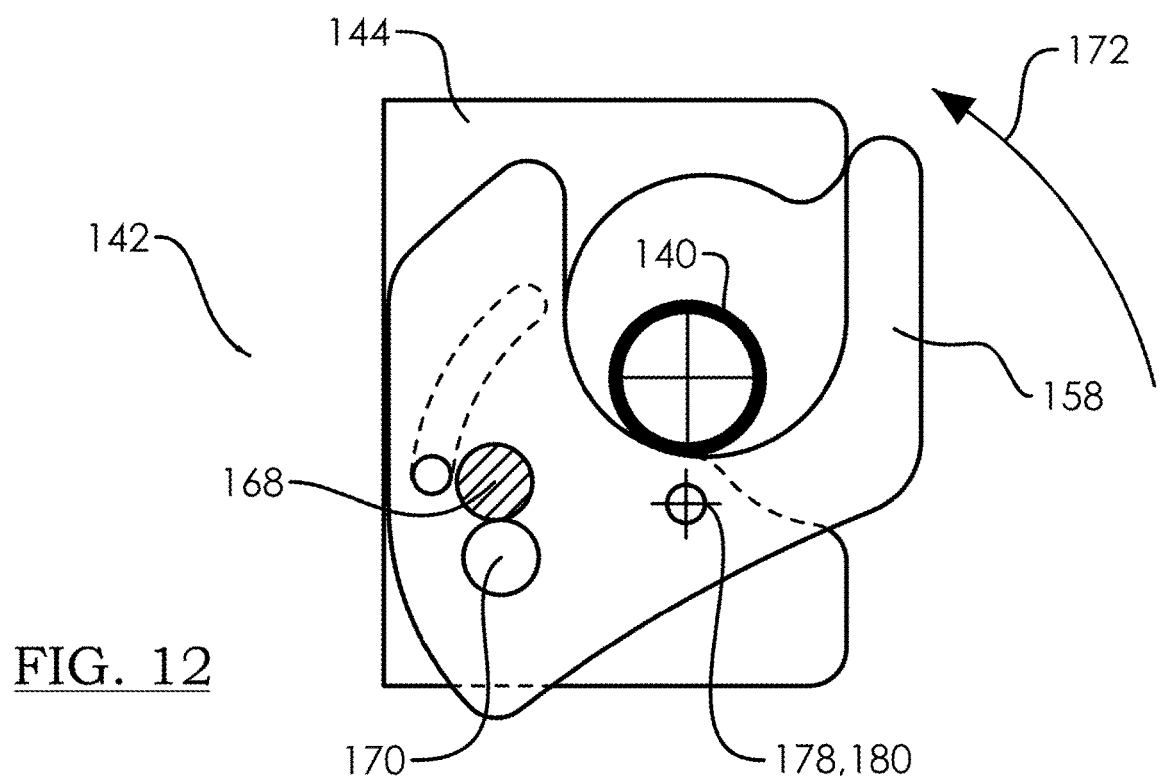
FIG. 12 is a side elevational assembly view of the rod holder of FIG. 11, showing the rod holder in the closed position, and supporting a rod.
Figure 14:
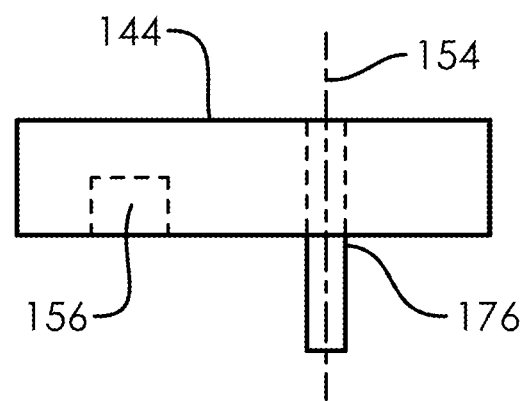
FIG. 14 is a top plan view of the base for the rod holder of FIG. 11.
Figure 13:
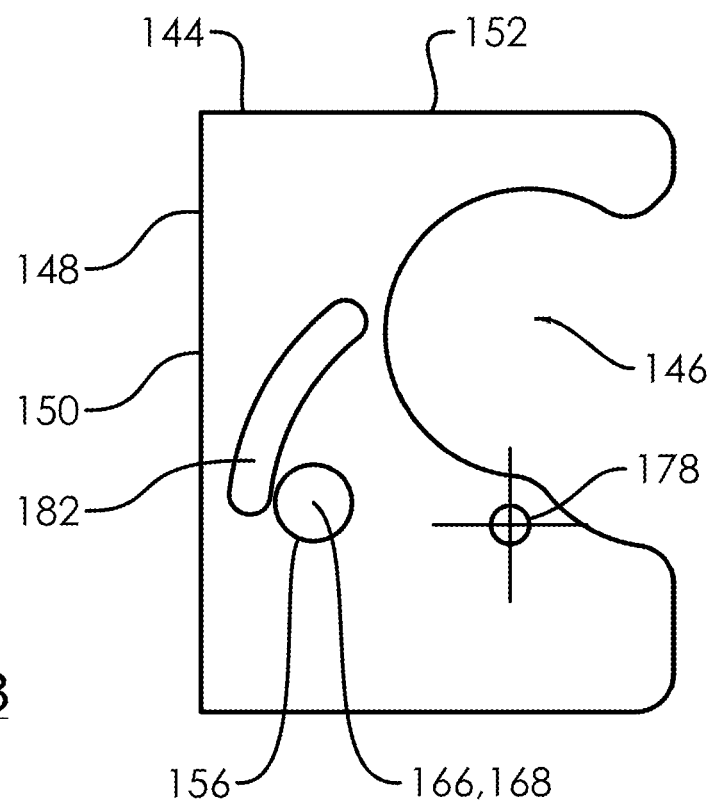
FIG. 13 is a front elevational view of a base for the rod holder of FIG. 11.
Figure 16:
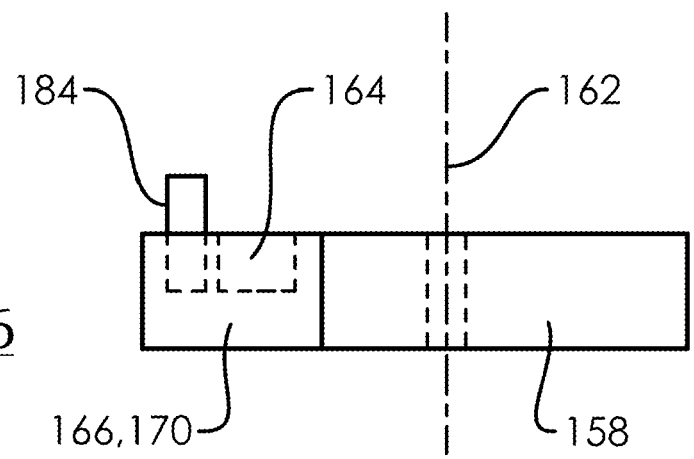
FIG. 16 is a top plan view of the latch for the rod holder of FIG. 11.
Figure 15:
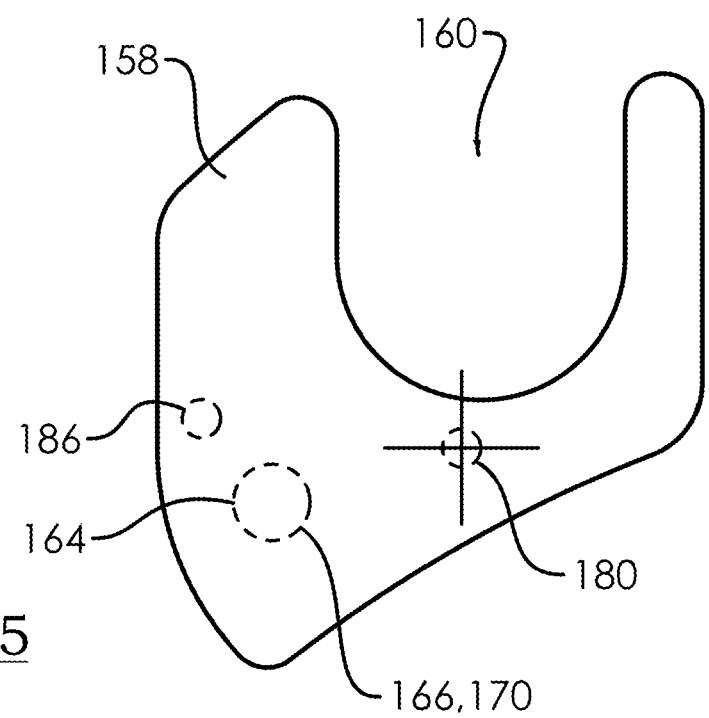
FIG. 15 is a front elevational view of a latch for the rod holder of FIG. 11.
Figure 17:
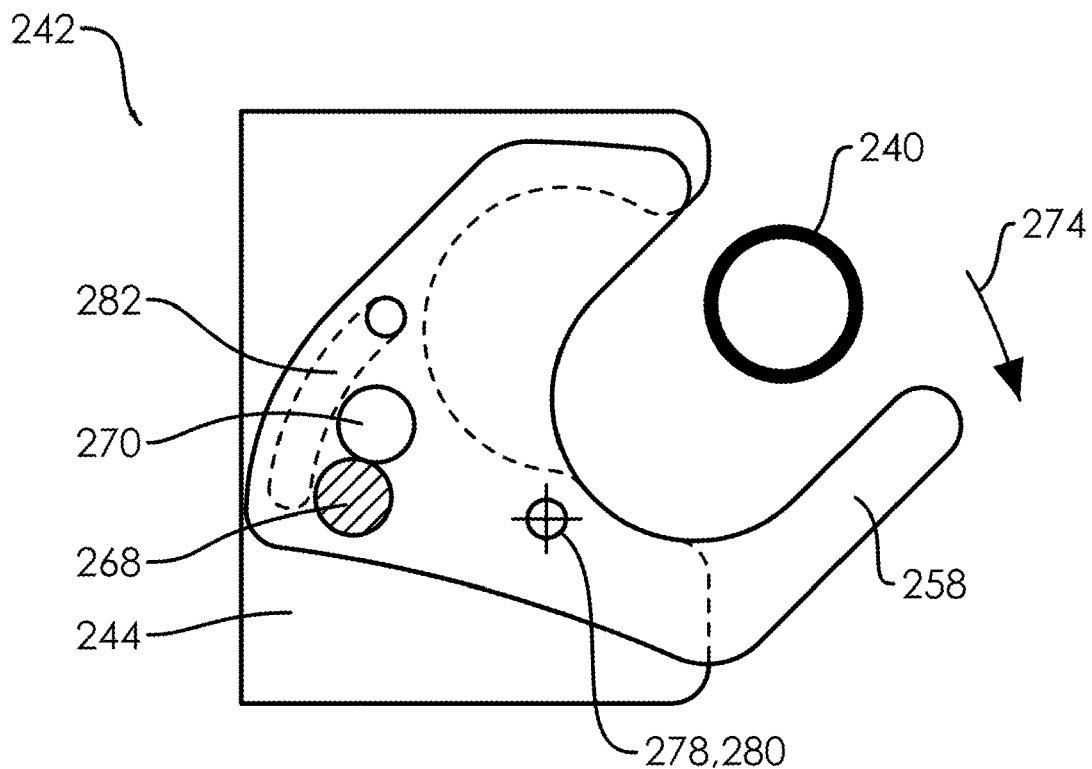
FIG. 17 is a side elevational assembly view of yet another exemplary rod holder constructed in accordance with the invention, showing the rod holder in the open position.
Figure 18:
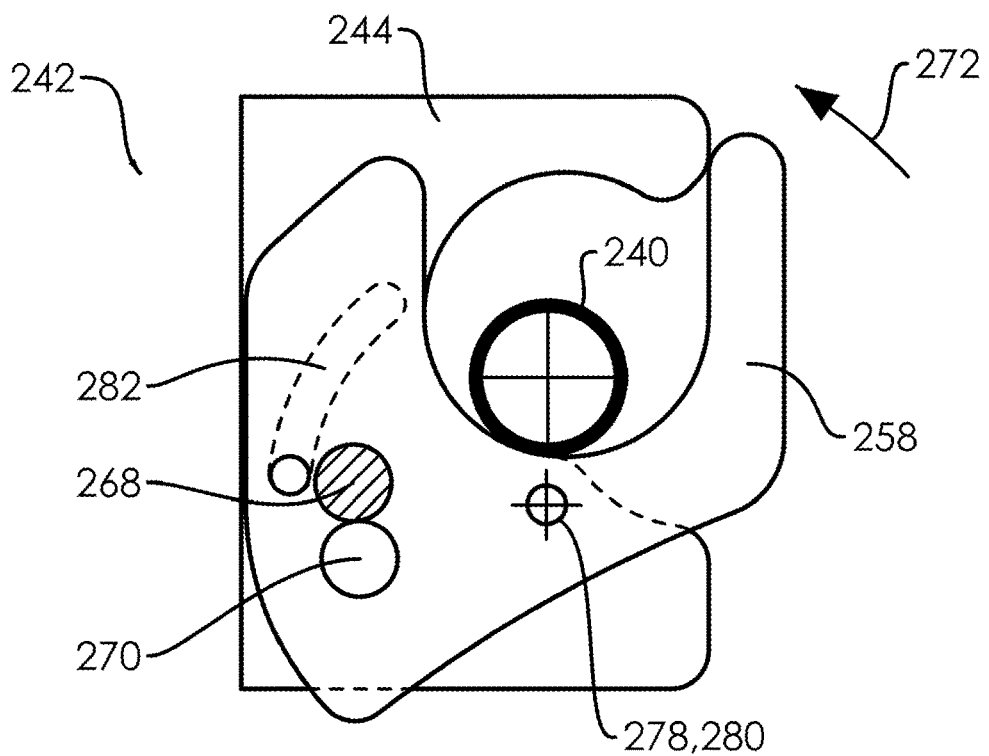
FIG. 18 is a side elevational assembly view of the rod holder of FIG. 17, showing the rod holder in the closed position, and supporting a rod.
Figure 20:
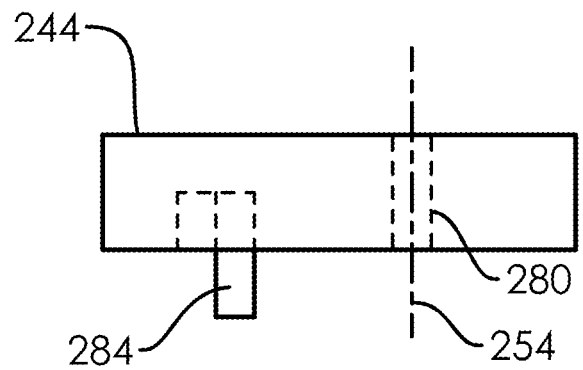
FIG. 20 is a top plan view of the base for the rod holder of FIG. 17.
Figure 19:
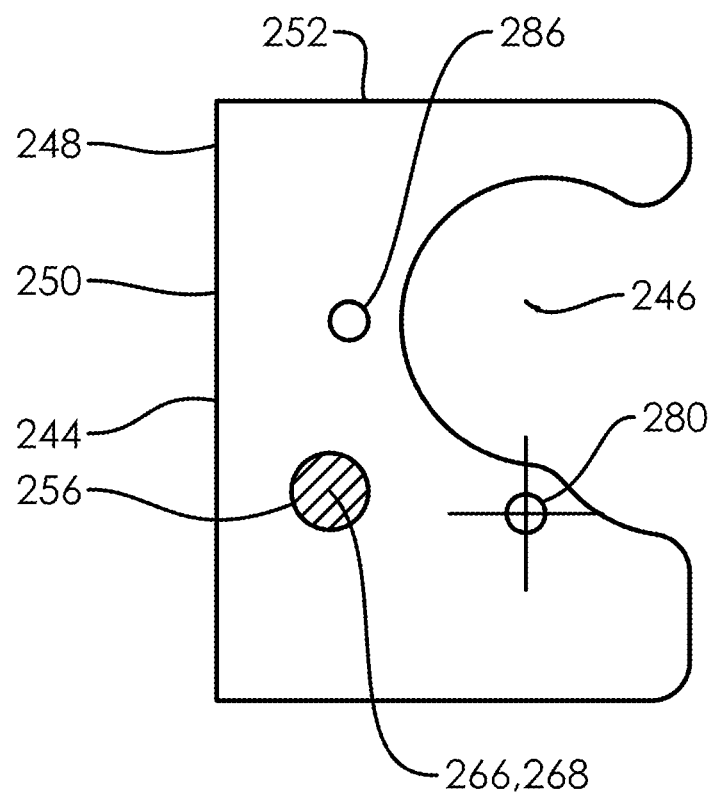
FIG. 19 is a front elevational view of a base for the rod holder of FIG. 17.
Figure 22:
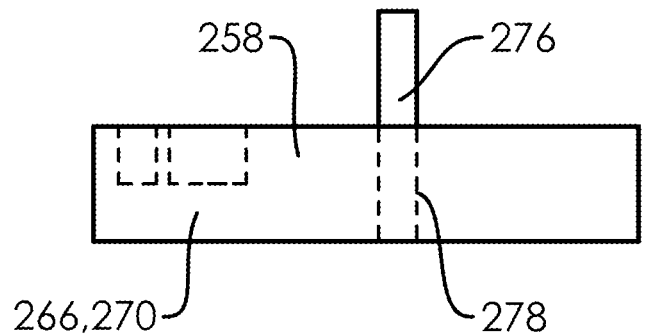
FIG. 22 is a top plan view of the latch for the rod holder of FIG. 17.
Figure 21:
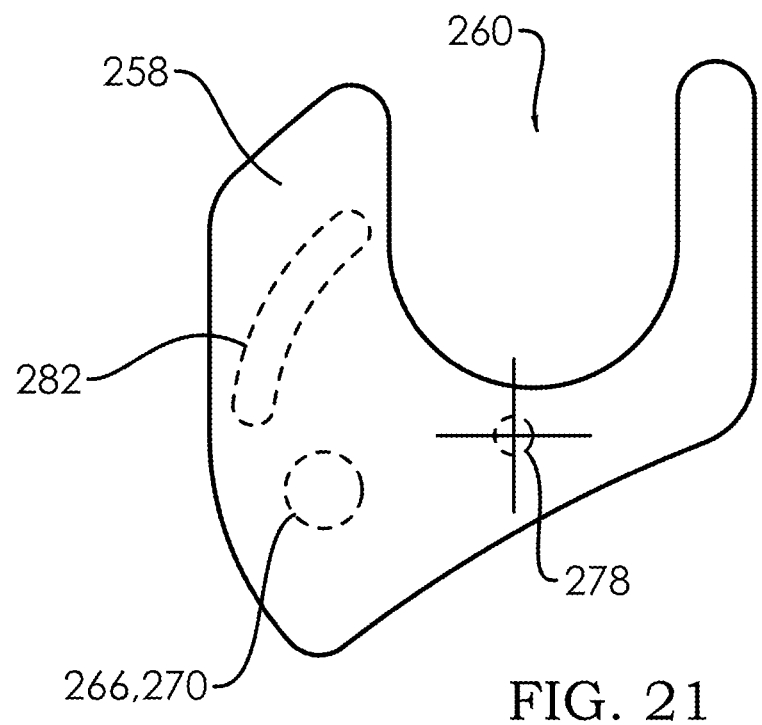
FIG. 21 is a front elevational view of a latch for the rod holder of FIG. 17.
Figure 23:
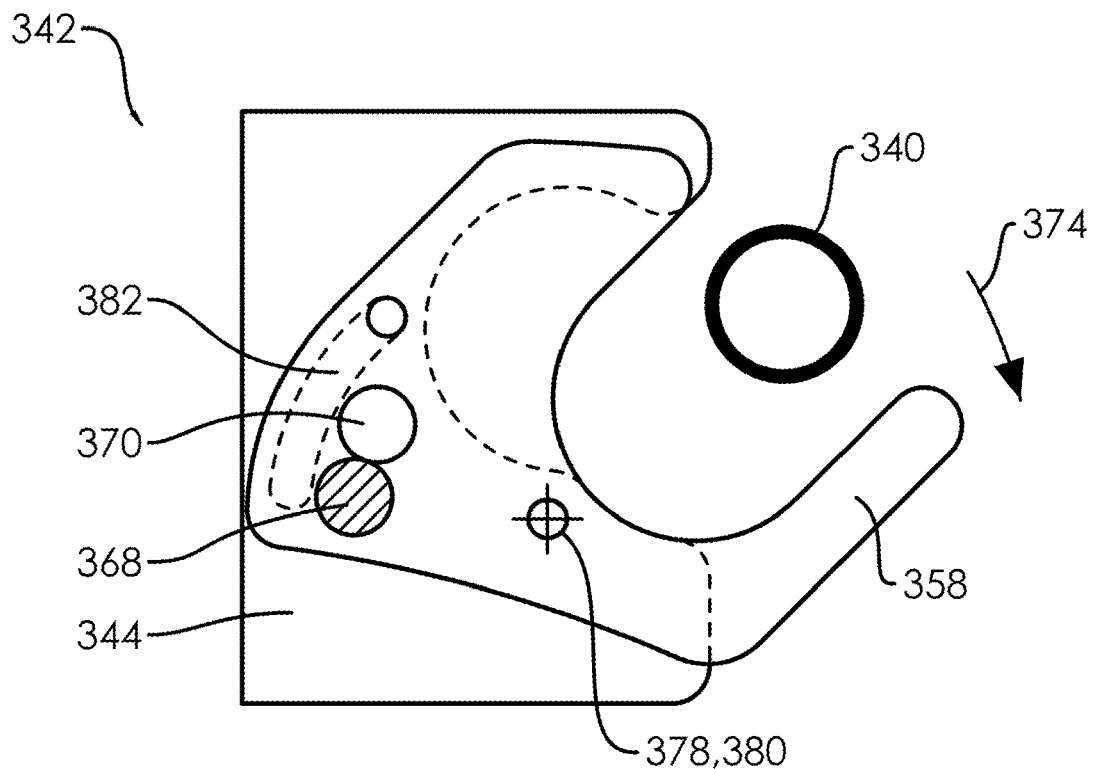
FIG. 23 is a side elevational assembly view of still another exemplary rod holder constructed in accordance with the invention, showing the rod holder in the open position.
Figure 24:
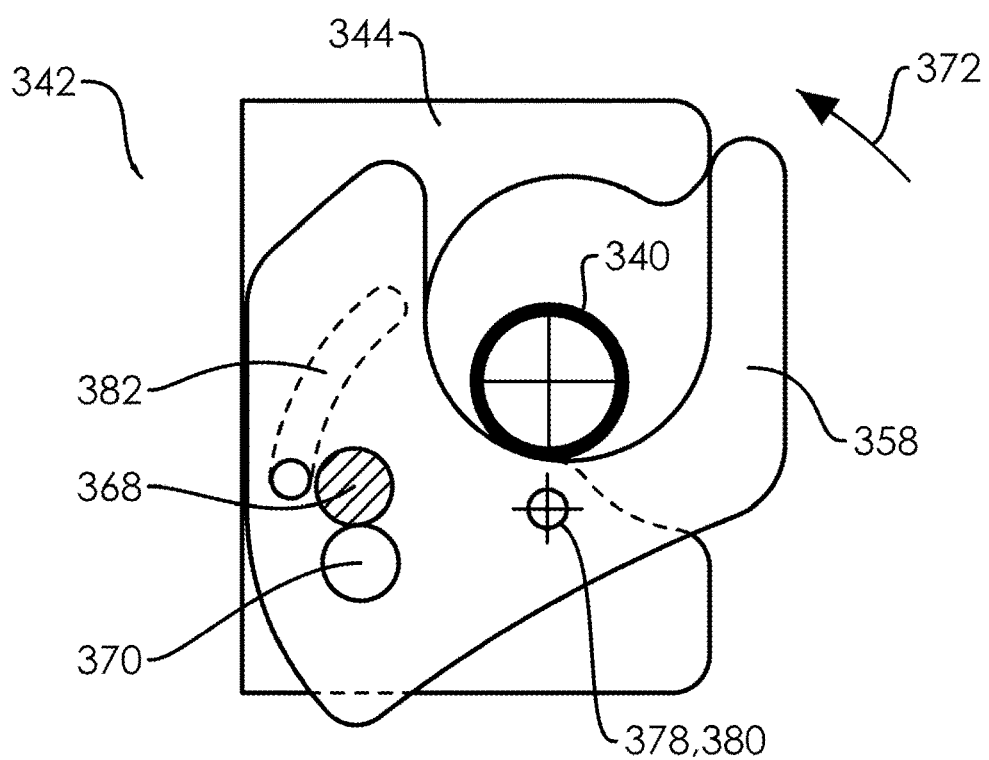
FIG. 24 is a side elevational assembly view of the rod holder of FIG. 23, showing the rod holder in the closed position, and supporting a rod.
Figure 26:
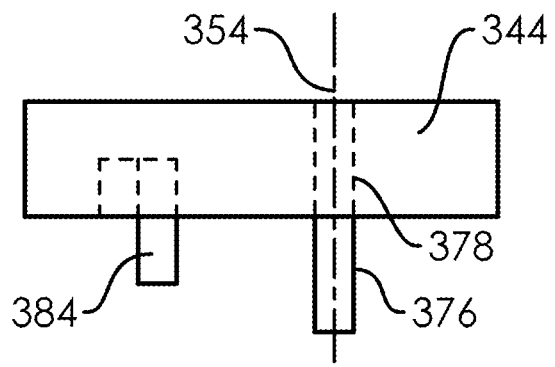
FIG. 26 is a top plan view of the base for the rod holder of FIG. 23.
Figure 25:
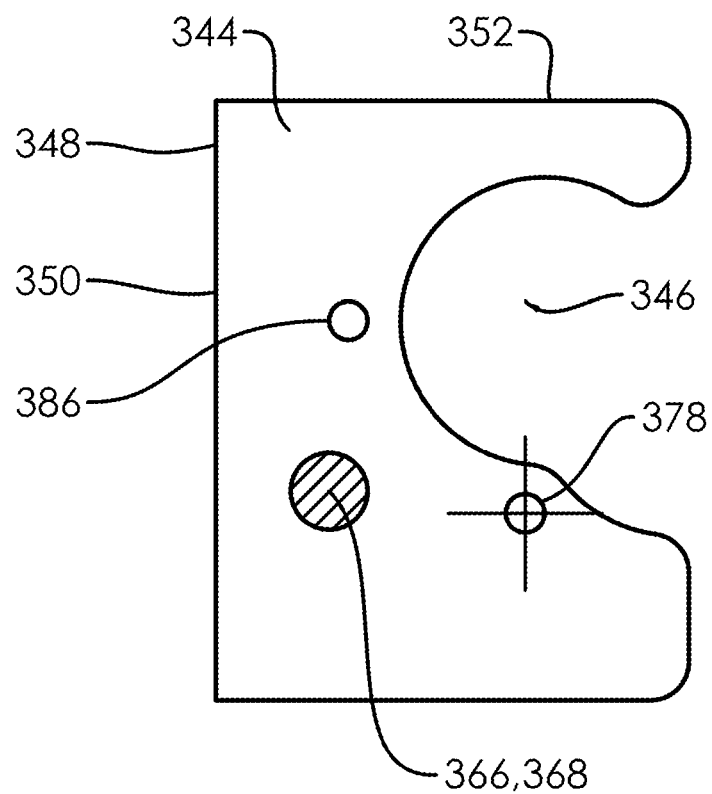
FIG. 25 is a front elevational view of a base for the rod holder of FIG. 23.
Figure 28:
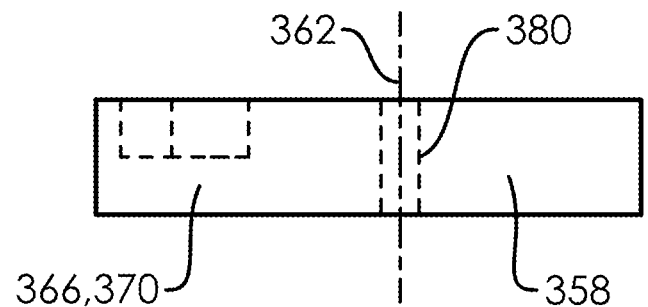
FIG. 28 is a top plan view of the latch for the rod holder of FIG. 23.
Figure 27:
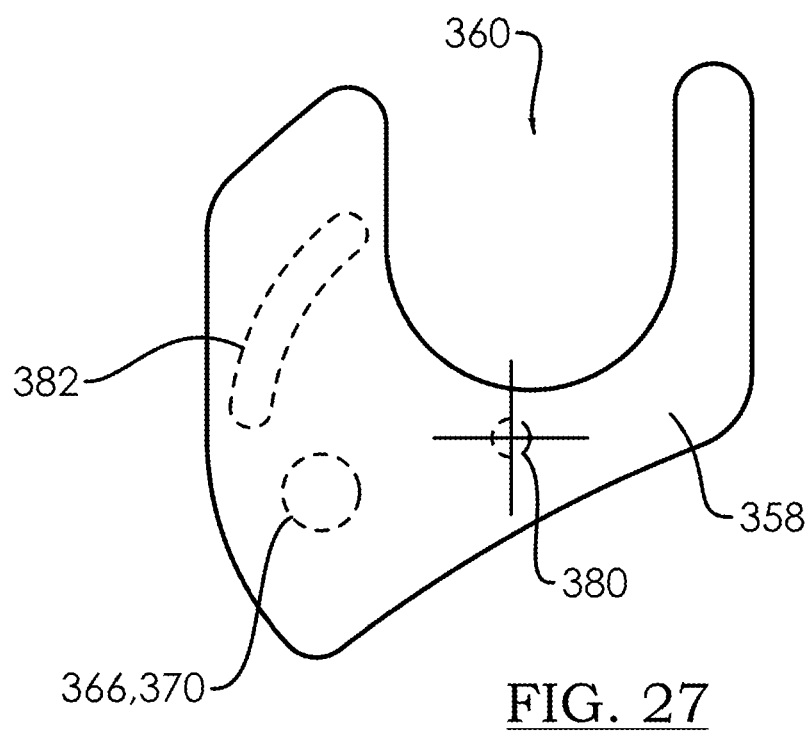
FIG. 27 is a front elevational view of a latch for the rod holder of FIG. 23.

Magnetic detent means 66 is provided for magnetically holding the latch 58 in the latch open position as shown in FIG. 3, and in the latch closed position as shown in FIG. 4. The magnetic detent means 66 comprises a base magnet 68 received in the base detent hole 56. A latch magnet 70 is received in the latch detent hole 64. The base magnet 68 and the latch magnet 70 are adapted to follow arcuate paths of the same radius as the latch 58 pivots between the latch closed position and the latch open position. Thus, the latch magnet 70 will pass over the base magnet 68. The magnets 68, 70 are mounted so that like poles of the base magnet 68 and the latch magnet 70 are facing one another. Hence, the magnets 68, 70 will repel one another. In passing from the latch closed position to the latch open position, the magnetic repulsion will snap the latch 58 into the latch open position. In the latch open position, the repulsion of the base magnet 68 and the latch magnet 70 will hold the latch 58 open. In passing from the latch open position to the latch closed position, the magnetic repulsion will snap the latch 58 into the latch closed position. In the latch closed position, the repulsion of the base magnet 68 and the latch magnet 70 will hold the latch 58 closed.

In the latch open position, upon placing the rod 40 into the rod holder 42, the rod 40 will be received in the base aperture 46 and the latch aperture 60. The rod 40 will pivot the latch 58 into the latch closed position, shown by arrow 72. The magnetic detent means 66 will secure the latch 58 in the latch closed position. The rod holder 42 will then support the rod 40 in a resting position.

In the latch closed position, upon removing the rod 40 from the rod holder 42, the rod 40 will pivot the latch 58 into the latch open position, shown by arrow 74. The rod 40 will be removed from the base aperture 46 and the latch aperture 60. The magnetic detent means 66 will secure the latch 58 in the latch open position.

A pivot pin 76 has a circular cross-section, and extends between opposite ends. The pivot pin 76 is fixedly received in a fixed pivot hole 78 in either one of the base 44 or the latch 58 at the pivot axis 54, 62. The pivot pin 76 is pivotally received in a free pivot hole 80 in the opposite one of the base 44 or the latch 58 at the pivot axis 54, 62.

An arcuate slot 82 is formed in either one of the base 44 or the latch 58. The arcuate slot 82 extends between opposite ends, and is centered about the pivot axis 54, 62. A limit pin 84 extends between opposite ends. The limit pin 84 is fixedly received in a limit pin hole 86 in either one of the base 44 or the latch 58 opposite the arcuate slot 82. The limit pin 84 is freely received in the arcuate slot 82. In the latch open position, the limit pin 84 will engage the arcuate slot 82 at one end of the slot. In the latch closed position, the limit pin 84 will engage the arcuate slot 82 at the opposite end of the slot. In this manner, the pivotal movement of the latch 58 is limited. The pivot pin 76 and the limit pin 84 placement can vary in several embodiments, as is detailed hereinbelow.

The base 44 and the latch 58 are preferably constructed of a polymeric material. Some examples are thermoplastic resins and thermoset resins. It is to be understood that these examples are non-limiting.

In one exemplary embodiment shown in FIG. 2, the base 44 and the latch 58 are disposed generally horizontal with the pivot axis 54, 62, extending upward. In the latch closed position, the rod holder 42 will support the rod (garden tools 36, 38) in the resting position with the rod disposed generally upright.

In another exemplary embodiment shown in FIG. 1, the base 44 and the latch 58 are disposed generally upright with the pivot axis 54, 62, extending generally horizontal. In the latch closed position, the rod holder 42 will support the rod 40 in the resting position with the rod 40 disposed generally horizontal. In the case of the fishing rod 40, the rod holder 42 will typically support the fishing rod 40 in a generally horizontal resting position. In the latch closed position and with the rod 40 in the resting position, the rod 40 is preferably disposed generally above the pivot axis 54, 62, as shown in FIG. 4. This juxtaposition is optional, and will minimize a rotational moment which would pivot the latch 58 into the latch open position. The resting position of the rod is non-limiting.

Referring to FIGS. 3-8, an exemplary embodiment of the rod holder 42 is disclosed. The pivot pin 76 is fixedly received in a fixed pivot hole 78 in the latch 58 at the latch pivot axis 62. The pivot pin 76 is pivotally received in a free pivot hole 80 in the base 44 at the base pivot axis 54. The pivot pin 76 is able to freely rotate in the free pivot hole 80, so as to allow free movement of the latch 58 between the open and closed positions. A retainer (not shown), such as a snap ring for example, can be used to secure the pivot pin 76 in the free pivot hole 80. Retainers of all types are well known in the art, and the retainer is non-limiting.

The base 44 has an arcuate slot 82 centered about the base pivot axis 54. The arcuate slot 82 extends between opposite ends A limit pin 84 is fixedly received in the limit pin hole 86 in the latch 58. The limit pin 84 is freely received in the arcuate slot 82. The limit pin 84 is able to slide freely in the arcuate slot 82 from either end to the opposite end. In the latch open position, the limit pin 84 will engage the arcuate slot 82 at one end of the slot. In the latch closed position, the limit pin 84 will engage the arcuate slot 82 at the opposite end of the slot. This will limit the pivotal movement of the latch 58.

Turning now to FIGS. 11-16, a further embodiment of the rod holder is disclosed. Rod holder 142 is similar to rod holder 42 above, in that rod holder 142 comprises a base 144 with a base aperture 146 for receiving the fishing rod 140. The base 144 has a mounting edge 148 adapted for mounting on the structure. The base aperture 146 is open generally outward away from the mounting edge 148. The base mounting edge 148 further comprises a generally upright first mounting edge 150 for mounting on a generally upright structure. The base mounting edge 148 also has a generally horizontal second mounting edge 152 for mounting on a generally horizontal structure. The base 144 has a base pivot axis 154, and a base detent hole 156.

The rod holder 142 has a latch 158 with a latch aperture 160 for receiving the rod 140. The latch 158 is pivotally mounted on the base 144 for pivotal movement between a latch open position and a latch closed position. The latch 158 has a latch pivot axis 162 about which the latch 158 pivots. The latch pivot axis 162 is in axial alignment with the base pivot axis 154. The latch aperture 160 is open generally outward away from the latch pivot axis 162. The latch 158 has a latch detent hole 164.

Magnetic detent means 166 is provided for magnetically holding the latch 158 in the latch open position, and in the latch closed position. The magnetic detent means 166 comprises a base magnet 168 received in the base detent hole 156. A latch magnet 170 is received in the latch detent hole 164. The base magnet 168 and the latch magnet 170 are adapted to follow arcuate paths of the same radius as the latch 158 pivots between the latch closed position and the latch open position. Thus, the latch magnet 170 will pass over the base magnet 168. The magnets 168, 170 are mounted so that like poles of the base magnet 168 and the latch magnet 170 are facing one another. Hence, the magnets 168, 170 will repel one another. In passing from the latch closed position to the latch open position, the magnetic repulsion will snap the latch 158 into the latch open position. In the latch open position, the repulsion of the base magnet 168 and the latch magnet 170 will hold the latch 158 open. In passing from the latch open position to the latch closed position, the magnetic repulsion will snap the latch 158 into the latch closed position. In the latch closed position, the repulsion of the base magnet 168 and the latch magnet 170 will hold the latch 158 closed.

In the latch open position, upon placing the rod 140 into the rod holder 142, the rod 140 will be received in the base aperture 146 and the latch aperture 160. The rod 140 will pivot the latch 158 into the latch closed position, shown by arrow 172. The magnetic detent means 166 will secure the latch 158 in the latch closed position. The rod holder 142 will then support the rod 140 in a resting position.

In the latch closed position, upon removing the rod 140 from the rod holder 142, the rod 140 will pivot the latch 158 into the latch open position, shown by arrow 174. The rod 140 will be removed from the base aperture 146 and the latch aperture 160. The magnetic detent means 166 will secure the latch 158 in the latch open position.

Rod holder 142 differs from rod holder 42 above, in that a pivot pin 176 is fixedly received in a fixed pivot hole 178 in the base 144 at the base pivot axis 154. The pivot pin 176 is pivotally received in a free pivot hole 180 in the latch 158 at the latch pivot axis 162.

An arcuate slot 182 in the base 144 extends between opposite ends. The arcuate slot 182 is centered about the base pivot axis 154. A limit pin 184 extends between opposite ends. The limit pin 184 is fixedly received in a limit pin hole 186 in the latch 158. The limit pin 184 is freely received in the arcuate slot 182. In the latch open position, the limit pin 184 will engage the arcuate slot 182 at one end of the slot. In the latch closed position, the limit pin 184 will engage the arcuate slot 182 at the opposite end of the slot. Hence, the pivotal movement of the latch is limited.

Referring now to FIGS. 17-22, a yet further embodiment of the rod holder is disclosed. Rod holder 242 is similar to rod holder 42 above, in that rod holder 242 comprises a base 244 with a base aperture 246 for receiving the fishing rod 240. The base 244 has a mounting edge 248 adapted for mounting on the structure. The base aperture 246 is open generally outward away from the mounting edge 248. The base mounting edge 248 further comprises a generally upright first mounting edge 250 for mounting on a generally upright structure. The base mounting edge 248 also has a generally horizontal second mounting edge 252 for mounting on a generally horizontal structure. The base 244 has a base pivot axis 254, and a base detent hole 256.

The rod holder 242 has a latch 258 with a latch aperture 260 for receiving the rod 240. The latch 258 is pivotally mounted on the base 244 for pivotal movement between a latch open position and a latch closed position. The latch 258 has a latch pivot axis 262 about which the latch 258 pivots. The latch pivot axis 262 is in axial alignment with the base pivot axis 254. The latch aperture 260 is open generally outward away from the latch pivot axis 262. The latch 258 has a latch detent hole 264.

Magnetic detent means 266 is provided for magnetically holding the latch 258 in the latch open position, and in the latch closed position. The magnetic detent means 266 comprises a base magnet 268 received in the base detent hole 256. A latch magnet 270 is received in the latch detent hole 264. The base magnet 268 and the latch magnet 270 are adapted to follow arcuate paths of the same radius as the latch 258 pivots between the latch closed position and the latch open position. Thus, the latch magnet 270 will pass over the base magnet 268. The magnets 268, 270 are mounted so that like poles of the base magnet 268 and the latch magnet 270 are facing one another. Hence, the magnets 268, 270 will repel one another. In passing from the latch closed position to the latch open position, the magnetic repulsion will snap the latch 258 into the latch open position. In the latch open position, the repulsion of the base magnet 268 and the latch magnet 270 will hold the latch 258 open. In passing from the latch open position to the latch closed position, the magnetic repulsion will snap the latch 258 into the latch closed position. In the latch closed position, the repulsion of the base magnet 268 and the latch magnet 270 will hold the latch 258 closed.

In the latch open position, upon placing the rod 240 into the rod holder 242, the rod 240 will be received in the base aperture 246 and the latch aperture 260. The rod 240 will pivot the latch 258 into the latch closed position, shown by arrow 272. The magnetic detent means 266 will secure the latch 258 in the latch closed position. The rod holder 242 will then support the rod 240 in a resting position.

In the latch closed position, upon removing the rod 240 from the rod holder 242, the rod 240 will pivot the latch 258 into the latch open position, shown by arrow 274. The rod 240 will be removed from the base aperture 246 and the latch aperture 260. The magnetic detent means 266 will secure the latch 258 in the latch open position.

Rod holder 242 differs from rod holder 42 above, in that a pivot pin 276 extends between opposite ends. The pivot pin 276 is fixedly received in a fixed pivot hole 278 in the latch 258 at the latch pivot axis 262. The pivot pin 276 is pivotally received in a free pivot hole 280 in the base 244 at the base pivot axis 254.

An arcuate slot 282 in the latch extends between opposite ends. The arcuate slot 282 is centered about the latch pivot axis 262. A limit pin 284 extends between opposite ends. The limit pin 284 is fixedly received in a limit pin hole 286 in the base 244. The limit pin 284 is freely received in the arcuate slot 282. In the latch open position, the limit pin 284 will engage the arcuate slot 282 at one end of the slot. In the latch closed position, the limit pin 284 will engage the arcuate slot 282 at the opposite end of the slot. Thus, the pivotal movement of the latch is limited.

Turning now to FIGS. 23-28, a still further embodiment of the rod holder is disclosed. Rod holder 342 is similar to rod holder 42 above, in that rod holder 342 comprises a base 344 with a base aperture 346 for receiving the fishing rod 340. The base 344 has a mounting edge 348 adapted for mounting on the structure. The base aperture 346 is open generally outward away from the mounting edge 348. The base mounting edge 348 further comprises a generally upright first mounting edge 350 for mounting on a generally upright structure. The base mounting edge 348 also has a generally horizontal second mounting edge 352 for mounting on a generally horizontal structure. The base 344 has a base pivot axis 354, and a base detent hole 356.

The rod holder 342 has a latch 358 with a latch aperture 360 for receiving the rod 340. The latch 358 is pivotally mounted on the base 344 for pivotal movement between a latch open position and a latch closed position. The latch 358 has a latch pivot axis 362 about which the latch 358 pivots. The latch pivot axis 362 is in axial alignment with the base pivot axis 354. The latch aperture 360 is open generally outward away from the latch pivot axis 362. The latch 358 has a latch detent hole 364.

Magnetic detent means 366 is provided for magnetically holding the latch 358 in the latch open position, and in the latch closed position. The magnetic detent means 366 comprises a base magnet 368 received in the base detent hole 356. A latch magnet 370 is received in the latch detent hole 364. The base magnet 368 and the latch magnet 370 are adapted to follow arcuate paths of the same radius as the latch 358 pivots between the latch closed position and the latch open position. Thus, the latch magnet 370 will pass over the base magnet 368. The magnets 368, 370 are mounted so that like poles of the base magnet 368 and the latch magnet 370 are facing one another. Hence, the magnets 368, 370 will repel one another. In passing from the latch closed position to the latch open position, the magnetic repulsion will snap the latch 358 into the latch open position. In the latch open position, the repulsion of the base magnet 368 and the latch magnet 370 will hold the latch 358 open. In passing from the latch open position to the latch closed position, the magnetic repulsion will snap the latch 358 into the latch closed position. In the latch closed position, the repulsion of the base magnet 368 and the latch magnet 370 will hold the latch 358 closed.

In the latch open position, upon placing the rod 340 into the rod holder 342, the rod 340 will be received in the base aperture 346 and the latch aperture 360. The rod 340 will pivot the latch 358 into the latch closed position, shown by arrow 372. The magnetic detent means 366 will secure the latch 358 in the latch closed position. The rod holder 342 will then support the rod 340 in a resting position.

In the latch closed position, upon removing the rod 340 from the rod holder 342, the rod 340 will pivot the latch 358 into the latch open position, shown by arrow 374. The rod 340 will be removed from the base aperture 346 and the latch aperture 360. The magnetic detent means 366 will secure the latch 358 in the latch open position.

Rod holder 342 differs from rod holder 42 above, in that a pivot pin 376 extends between opposite ends. The pivot pin 376 is fixedly received in a fixed pivot hole 378 in the base 344 at the base pivot axis 354. The pivot pin 376 is pivotally received in a free pivot hole 380 in the latch 358 at the latch pivot axis 362.

An arcuate slot 382 in the latch 358 extends between opposite ends. The arcuate slot 382 is centered about the latch pivot axis 362. A limit pin 384 extends between opposite ends. The limit pin 384 is fixedly received in a limit pin hole 386 in the base 344. The limit pin 384 is freely received in the arcuate slot 382. In the latch open position, the limit pin 384 will engage the arcuate slot 382 at one end of the slot. In the latch closed position, the limit pin 384 will engage the arcuate slot 382 at the opposite end of the slot. In this manner, the pivotal movement of the latch 358 will be limited.

It will be appreciated that variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

PARTS LIST

Rod Holder

Part
No. Description
30 structure
32 vertical wall
34 horizontal ceiling
36 cleaning tool
38 garden tool
40 fishing rod
42 rod holder
44 base
46 base aperture
48 mounting edge
50 first mounting edge
52 second mounting edge
54 base pivot axis
56 base detent hole
58 latch
60 latch aperture
62 latch pivot axis
64 latch detent hole
66 magnetic detent means
68 base magnet
70 latch magnet
72 latch closed arrow
74 latch open arrow
76 pivot pin
78 fixed pivot hole
80 free pivot hole
82 arcuate slot
84 limit pin
86 limit pin hole
140 rod
142 rod holder
144 base
146 base aperture
148 mounting edge
150 first mounting edge
152 second mounting edge
154 base pivot axis
156 base detent hole
158 latch
160 latch aperture
162 latch pivot axis
164 latch detent hole
166 magnetic detent means
168 base magnet
170 latch magnet
172 latch closed arrow
174 latch open arrow
176 pivot pin
178 fixed pivot hole
180 free pivot hole
182 arcuate slot
184 limit pin
186 limit pin hole
240 rod 358 latch
242 rod holder
244 base
246 base aperture
248 mounting edge
250 first mounting edge
252 second mounting edge
254 base pivot axis
256 base detent hole
258 latch
260 latch aperture
262 latch pivot axis
264 latch detent hole
266 magnetic detent means
268 base magnet
270 latch magnet
272 latch closed arrow
274 latch open arrow
276 pivot pin
278 fixed pivot hole
280 free pivot hole
282 arcuate slot
284 limit pin
286 limit pin hole
340 rod
342 rod holder
344 base
346 base aperture
348 mounting edge
350 first mounting edge
352 second mounting edge
354 base pivot axis
356 base detent hole
360 latch aperture
362 latch pivot axis
364 latch detent hole
366 magnetic detent means
368 base magnet
370 latch magnet
372 latch closed arrow
374 latch open arrow
376 pivot pin
378 fixed pivot hole
380 free pivot hole
382 arcuate slot
384 limit pin
386 limit pin hole The embodiments of the invention in which an exclusive property or privilege is claimed are defined as follows:

1. A rod holder, for use in connection with an elongated rod and a structure, the rod holder comprising:
   a base, the base having a base aperture for receiving the rod, the base being adapted for mounting on the structure and projecting outward therefrom;
   a latch, the latch having a latch aperture for receiving the rod, the latch being pivotally mounted on the base for pivotal movement between a latch open position and a latch closed position; and magnetic detent means for magnetically holding the latch in the latch open position and in the latch closed position; wherein in the latch open position, upon placing the rod into the rod holder, the rod will be received in the base aperture and the latch aperture, the rod will pivot the latch into the latch closed position, the magnetic detent means will secure the latch in the latch closed position, and the rod holder will support the rod in a resting position; and in the latch closed position, upon removing the rod from the rod holder, the rod will pivot the latch into the latch open position, the rod will be removed from the base aperture and the latch aperture, and the magnetic detent means will secure the latch in the latch open position.

2. The rod holder of claim 1, wherein the base further comprises:
a mounting edge for mounting on the structure;
a base pivot axis about which the latch pivots;
a base detent hole for receiving the magnetic detent means; and
the base aperture being open generally outward away from the mounting edge.

3. The rod holder of claim 2, wherein the base further comprises:
a first mounting edge for mounting on the structure, wherein the structure is disposed generally upright; and
a second mounting edge for mounting on the structure, wherein the structure is disposed generally horizontal.

4. The rod holder of claim 3, wherein the latch further comprises:
a latch pivot axis about which the latch pivots, the latch pivot axis being in axial alignment with the base pivot axis, the latch aperture being open generally outward away from the latch pivot axis; and
a latch detent hole for receiving the magnetic detent means.

5. The rod holder of claim 4, further comprising:
a pivot pin extending between opposite ends, the pivot pin being fixedly received in a fixed pivot hole in one of the base and the latch at the pivot axis, the pivot pin being pivotally received in a free pivot hole in the opposite one of the base and the latch at the pivot axis, so as to allow the latch to freely pivot with respect to the base.

6. The rod holder of claim 5, further comprising:
an arcuate slot in one of the base and the latch, the arcuate slot extending between opposite ends, the arcuate slot being centered about the pivot axis; and
a limit pin extending between opposite ends, the limit pin being fixedly received in a limit pin hole in one of the base and the latch opposite the arcuate slot, the limit pin being freely received in the arcuate slot; wherein
in the latch open position, the limit pin will engage the arcuate slot at one end of the slot, and in the latch closed position, the limit pin will engage the arcuate slot at the opposite end of the slot, so as to limit the pivotal movement of the latch.

7. The rod holder of claim 6, wherein the magnetic detent means further comprises:
a base magnet received in the base detent hole; and
a latch magnet received in the latch detent hole; wherein
the base magnet and the latch magnet are adapted to follow arcuate paths of the same radius as the latch pivots between the latch closed position and the latch open position, so that the latch magnet will pass over the base magnet; and
like poles of the base magnet and the latch magnet are facing one another, so as to repel one another; whereby in the latch open position, the repulsion of the base magnet and the latch magnet will hold the latch open, and in the latch closed position, the repulsion of the base magnet and the latch magnet will hold the latch closed.

8. The rod holder of claim 7, wherein the base and the latch are constructed of a polymeric material selected from the group consisting of thermoplastic resins and thermoset resins.

9. The rod holder of claim 8, wherein in the latch closed position and the rod in the resting position, the rod is disposed generally above the latch pivot axis, so as to minimize a moment which would pivot the latch into the latch open position.

10. A rod holder, for use in connection with an elongated rod and a structure, the rod holder comprising:
a base, the base having a base aperture for receiving the rod, the base having a mounting edge adapted for mounting on the structure, the base aperture being open generally outward away from the mounting edge, the base having a base pivot axis, the base having a base detent hole;
a latch, the latch having a latch aperture for receiving the rod, the latch being pivotally mounted on the base for pivotal movement between a latch open position and a latch closed position, the latch having a latch pivot axis about which the latch pivots, the latch pivot axis being in axial alignment with the base pivot axis, the latch aperture being open generally outward away from the latch pivot axis, the latch having a latch detent hole; and
magnetic detent means for magnetically holding the latch in the latch open position and in the latch closed position; wherein
in the latch open position, upon placing the rod into the rod holder, the rod will be received in the base aperture and the latch aperture, the rod will pivot the latch into the latch closed position, the magnetic detent means will secure the latch in the latch closed position, and the rod holder will support the rod in a resting position; and
in the latch closed position, upon removing the rod from the rod holder, the rod will pivot the latch into the latch open position, the rod will be removed from the base aperture and the latch aperture, and the magnetic detent means will secure the latch in the latch open position.

11. The rod holder of claim 10, wherein the base further comprises:
a first mounting edge for mounting on the structure, wherein the structure is disposed generally upright; and
a second mounting edge for mounting on the structure, wherein the structure is disposed generally horizontal.

12. The rod holder of claim 11, further comprising:
a pivot pin extending between opposite ends, the pivot pin being fixedly received in a fixed pivot hole in one of the base and the latch at the pivot axis, the pivot pin being pivotally received in a free pivot hole in the opposite one of the base and the latch at the pivot axis;
an arcuate slot in one of the base and the latch, the arcuate slot extending between opposite ends, the arcuate slot being centered about the pivot axis; and
a limit pin extending between opposite ends, the limit pin being fixedly received in a limit pin hole in one of the base and the latch opposite the arcuate slot, the limit pin being freely received in the arcuate slot; wherein
in the latch open position, the limit pin will engage the arcuate slot at one end of the slot, and in the latch closed position, the limit pin will engage the arcuate slot at the opposite end of the slot, so as to limit the pivotal movement of the latch.

13. The rod holder of claim 12, wherein the magnetic detent means further comprises:
a base magnet received in the base detent hole; and
a latch magnet received in the latch detent hole; wherein
the base magnet and the latch magnet are adapted to follow arcuate paths of the same radius as the latch pivots between the latch closed position and the latch open position, so that the latch magnet will pass over the base magnet; and
like poles of the base magnet and the latch magnet are facing one another, so as to repel one another; whereby
in the latch open position, the repulsion of the base magnet and the latch magnet will hold the latch open, and in the latch closed position, the repulsion of the base magnet and the latch magnet will hold the latch closed.

14. The rod holder of claim 13, wherein the base and the latch are constructed of a polymeric material selected from the group consisting of thermoplastic resins and thermoset resins.

15. The rod holder of claim 14, wherein:
the base and the latch are disposed generally horizontal with the pivot axis extending upward; and
in the latch closed position, the rod holder will support the rod in the resting position with the rod disposed generally upright.

16. The rod holder of claim 14, wherein:
the base and the latch are disposed generally upright with the pivot axis extending generally horizontal; and
in the latch closed position, the rod holder will support the rod in the resting position with the rod disposed generally horizontal.

17. The rod holder of claim 16, wherein in the latch closed position and the rod in the resting position, the rod is disposed generally above the latch pivot axis, so as to minimize a moment which would pivot the latch into the latch open position.

18. A rod holder, for use in connection with a fishing rod and a boat structure, the rod holder comprising:
a base, the base having a base aperture for receiving the fishing rod, the base having a mounting edge adapted for mounting on the boat structure, the base aperture being open generally outward away from the mounting edge, the base having a generally horizontal base pivot axis, the base having a base detent hole;
a latch, the latch having a latch aperture for receiving the fishing rod, the latch being pivotally mounted on the base for pivotal movement between a latch open position and a latch closed position, the latch having a latch pivot axis about which the latch pivots, the latch pivot axis being in axial alignment with the base pivot axis, the latch aperture being open generally outward away from the latch pivot axis, the latch having a latch detent hole; and
magnetic detent means for magnetically holding the latch in the latch open position and in the latch closed position; wherein
in the latch open position, upon placing the fishing rod into the rod holder, the fishing rod will be received in the base aperture and the latch aperture, the fishing rod will pivot the latch into the latch closed position, the magnetic detent means will secure the latch in the latch closed position, and the rod holder will support the fishing rod in a generally horizontal resting position; and in the latch closed position, upon removing the fishing rod from the rod holder, the fishing rod will pivot the latch into the latch open position, the fishing rod will be removed from the base aperture and the latch aperture, and the magnetic detent means will secure the latch in the latch open position.

19. The rod holder of claim 18, wherein the base further comprises:
a generally upright first mounting edge for mounting on the boat structure, wherein the boat structure is a wall disposed generally upright; and
a generally horizontal second mounting edge for mounting on the boat structure, wherein the boat structure is a ceiling disposed generally horizontal.

20. The rod holder of claim 19, wherein the magnetic detent means further comprises:
a base magnet received in the base detent hole; and
a latch magnet received in the latch detent hole; wherein
the base magnet and the latch magnet are adapted to follow arcuate paths of the same radius as the latch pivots between the latch closed position and the latch open position, so that the latch magnet will pass over the base magnet; and
like poles of the base magnet and the latch magnet are facing one another, so as to repel one another; whereby
in the latch open position, the repulsion of the base magnet and the latch magnet will hold the latch open, and in the latch closed position, the repulsion of the base magnet and the latch magnet will hold the latch closed.

21. The rod holder of claim 20, further comprising:
a pivot pin extending between opposite ends, the pivot pin being fixedly received in a fixed pivot hole in the latch at the pivot axis, the pivot pin being pivotally received in a free pivot hole in the base at the pivot axis;
an arcuate slot in the base, the arcuate slot extending between opposite ends, the arcuate slot being centered about the pivot axis; and
a limit pin extending between opposite ends, the limit pin being fixedly received in a limit pin hole in the latch, the limit pin being freely received in the arcuate slot;
wherein in the latch open position, the limit pin will engage the arcuate slot at one end of the slot, and in the latch closed position, the limit pin will engage the arcuate slot at the opposite end of the slot, so as to limit the pivotal movement of the latch.

22. The rod holder of claim 20, further comprising:
a pivot pin extending between opposite ends, the pivot pin being fixedly received in a fixed pivot hole in the base at the pivot axis, the pivot pin being pivotally received in a free pivot hole in the latch at the pivot axis;
an arcuate slot in the base, the arcuate slot extending between opposite ends, the arcuate slot being centered about the pivot axis; and
a limit pin extending between opposite ends, the limit pin being fixedly received in a limit pin hole in the latch, the limit pin being freely received in the arcuate slot; wherein
in the latch open position, the limit pin will engage the arcuate slot at one end of the slot, and in the latch closed position, the limit pin will engage the arcuate slot at the opposite end of the slot, so as to limit the pivotal movement of the latch.

23. The rod holder of claim 20, further comprising:
a pivot pin extending between opposite ends, the pivot pin being fixedly received in a fixed pivot hole in the latch at the pivot axis, the pivot pin being pivotally received in a free pivot hole in the base at the pivot axis;

an arcuate slot in the latch, the arcuate slot extending between opposite ends, the arcuate slot being centered about the pivot axis; and a limit pin extending between opposite ends, the limit pin being fixedly received in a limit pin hole in the base, the limit pin being freely received in the arcuate slot; wherein in the latch open position, the limit pin will engage the arcuate slot at one end of the slot, and in the latch closed position, the limit pin will engage the arcuate slot at the opposite end of the slot, so as to limit the pivotal movement of the latch.

24. The rod holder of claim 20, further comprising:

a pivot pin extending between opposite ends, the pivot pin being fixedly received in a fixed pivot hole in the base at the pivot axis, the pivot pin being pivotally received in a free pivot hole in the latch at the pivot axis;

an arcuate slot in the latch, the arcuate slot extending between opposite ends, the arcuate slot being centered about the pivot axis; and a limit pin extending between opposite ends, the limit pin being fixedly received in a limit pin hole in the base, the limit pin being freely received in the arcuate slot;

wherein in the latch open position, the limit pin will engage the arcuate slot at one end of the slot, and in the latch closed position, the limit pin will engage the arcuate slot at the opposite end of the slot, so as to limit the pivotal movement of the latch.

25. The rod holder of claim 20, wherein in the latch closed position and the rod in the resting position, the rod is disposed generally above the latch pivot axis, so as to minimize a moment which would pivot the latch into the latch open position.

* * * * *